US008255755B2

(12) United States Patent
Tsuji et al.

(10) Patent No.: US 8,255,755 B2
(45) Date of Patent: Aug. 28, 2012

(54) SYSTEM, METHOD, AND APPARATUS FOR RETRANSMITTING BROADCAST PACKETS BASED ON COMPARING A NUMBER OF RECEIVED BROADCAST PACKETS HAVING CYCLIC CONTINUITY COUNTER VALUES CONSECUTIVE TO EACH OTHER TO A PREDETERMINED THRESHOLD

(75) Inventors: Tomohiro Tsuji, Saitama (JP); Naoya Nishi, Tokyo (JP)

(73) Assignee: KDDI Corporation, Tokyo (JP)

( * ) Notice: Subject to any disclaimer, the term of this patent is extended or adjusted under 35 U.S.C. 154(b) by 941 days.

(21) Appl. No.: 12/237,852

(22) Filed: Sep. 25, 2008

(65) Prior Publication Data
US 2009/0089640 A1 Apr. 2, 2009

(30) Foreign Application Priority Data

Sep. 29, 2007 (JP) ................................. 2007-256919

(51) Int. Cl.
*H04L 12/54* (2006.01)
*H04L 12/56* (2006.01)
*H04L 1/00* (2006.01)

(52) U.S. Cl. ........ 714/748; 370/230; 370/252; 370/390; 370/394; 370/428; 370/429; 370/432; 370/412

(58) Field of Classification Search .......................... None
See application file for complete search history.

(56) References Cited

U.S. PATENT DOCUMENTS

| 7,627,887 B2* | 12/2009 | Bisher et al. ................... 725/91 |
| 2004/0215796 A1* | 10/2004 | Maeda et al. .................. 709/230 |
| 2005/0201399 A1* | 9/2005 | Woodward et al. ........... 370/412 |
| 2006/0200574 A1* | 9/2006 | Pickens et al. ................ 709/231 |
| 2007/0091917 A1* | 4/2007 | Schoenblum ................. 370/464 |
| 2009/0110082 A1* | 4/2009 | Ahmed et al. ............ 375/240.27 |
| 2010/0208856 A1* | 8/2010 | Fuchikami et al. ........... 375/371 |

FOREIGN PATENT DOCUMENTS

| JP | 2007-068094 A | 3/2007 |
| JP | 2007-166410 A | 6/2007 |
| WO | 2007/034418 A2 | 3/2007 |

OTHER PUBLICATIONS

Japanese Office Action dated Apr. 19, 2012, issued in corresponding application 2007-256919, with partial translation.

* cited by examiner

*Primary Examiner* — M. Mujtaba K Chaudry
*Assistant Examiner* — Justin R Knapp
(74) *Attorney, Agent, or Firm* — Westerman, Hattori, Daniels & Adrian, LLP (57) ABSTRACT

A retransmission apparatus retransmits TS (Transport Stream) packets based on a received broadcast wave to a plurality of receiving apparatuses through a network. The retransmission apparatus has a TS packet determination unit for making a determination as to whether a number of received TS packets which include therein cyclic continuity counter values consecutive to each other is equal to or larger than a first predetermined threshold value N, and further configured to retransmit the received TS packets to the plurality of receiving apparatuses when the determination is true, and to drop the received TS packets when the determination is false.

9 Claims, 6 Drawing Sheets

SYSTEM, METHOD, AND APPARATUS FOR RETRANSMITTING BROADCAST PACKETS BASED ON COMPARING A NUMBER OF RECEIVED BROADCAST PACKETS HAVING CYCLIC CONTINUITY COUNTER VALUES CONSECUTIVE TO EACH OTHER TO A PREDETERMINED THRESHOLD

CROSS-REFERENCE TO RELATED APPLICATIONS

This application claims the priority benefit of Japanese Patent Application No. 2007-256919, filed Sep. 29, 2007, the content of which is incorporated herein by reference in its entirety.

BACKGROUND OF THE INVENTION

1. Field of the Invention

The present invention relates to a retransmission apparatus, a system and a method for retransmitting broadcast packets.

2. Description of the Related Art

Recently, there is a service that Transport Stream (TS) packets of the terrestrial digital broadcasting or Moving Picture Experts Group 2 (MPEG2-TS) packets are transmitted through an Internet Protocol (IP) network by multicast communication.

For example, there is a report made by KDDI Corporation, "On action of the telecommunications service broadcasting business and IP retransmission of the terrestrial digital broadcast by KDDI Corporation in Japan".

Specifically, in this report, a digital broadcast wave or signal is received by using an antenna, and TS packets in the received signal are retransmitted to a plurality of receiving apparatuses through an IP network.

Figure 1:
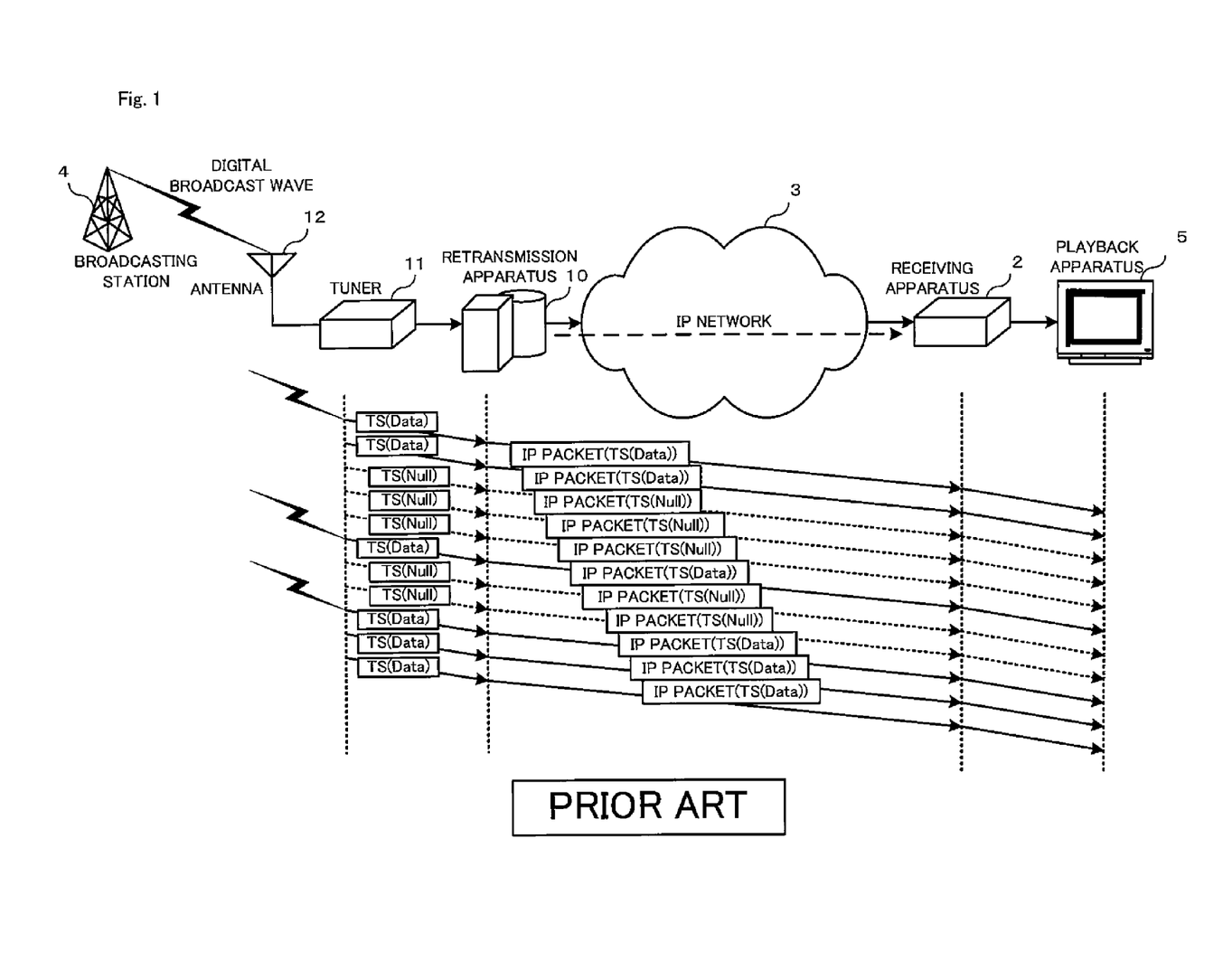
FIG. 1 is a system configuration diagram for the related art.

FIG. 1 is a system configuration diagram for the related art.

As shown in FIG. 1, a digital broadcast wave (Radio Frequency (RF) signal) broadcasted from a broadcasting station 4 is received by an antenna 12. The antenna 12 is connected to a tuner 11. The tuner can be tuned to a frequency of a specific channel of broadcast waves. The tuner 11 gets TS packets from the tuned channel of the broadcast waves, and the TS packet is sent to a retransmission apparatus 10.

The retransmission apparatus 10 generates an IP packet whose payload is TS packets outputted from the tuner 11. The IP packet is sent to a plurality of receiving apparatuses 2 (a representative one of them is illustrated) through an IP network 3.

Each receiving apparatus 2 extracts the TS packets from the IP packet received through the IP network 3. Then, the TS packets are converted into an RF signal. The RF signal is outputted to a playback apparatus 5 such as a television set.

The sequence depicted in FIG. 1 shows about the case where the digital broadcast wave broadcasted from the broadcasting station 4 is not received by the antenna 12. For example, broadcasting of the digital broadcast wave that the antenna 12 is to receive through air can be shut down, that is, can go off the air, or even if the broadcasting successfully continues, the antenna 12 may not be able to successfully receive the transmitted broadcast wave, depending on the time or the place. In such situations, no RF signal is inputted into the tuner 11 connected to the antenna 12. Then, the tuner 11 may be designed to output null TS packets without disruption, or continuously, in order to maintain a constant output rate of the TS packets. At this time, the retransmission apparatus 10 sends all these null TS packets to the receiving apparatuses 2 through the IP network 3.

Despite the above-mentioned related art, the null TS packets added by the tuner 11 are not substantially necessary for playing back the broadcast wave. While the broadcasting of the broadcast wave is off the air, the null TS packets keep on being sent to the IP network 3, only in order to maintain a constant output rate of the TS packets. This means that a portion of a limited communication resource is wasted.

Further, while receiving the null TS packets added by the tuner 11, each receiving apparatus 2 determines that the broadcasting of the broadcast wave is off the air. On the other hand, while receiving no TS packet, each receiving apparatus 2 determines that the IP network 3 itself fails.

BRIEF SUMMARY OF THE INVENTION

According to a first aspect of the present invention, there is provided a retransmission apparatus for retransmitting Transport Stream (TS) packets based on a received broadcast wave to a plurality of receiving apparatuses through a network, the retransmission apparatus comprising:

a TS packet determination unit configured to make a determination as to whether a number of received TS packets which include therein cyclic continuity counter values consecutive to each other is equal to or larger than a first predetermined threshold value N, and further configured to retransmit the received TS packets to the plurality of receiving apparatuses when the determination is true, and to drop the received TS packets when the determination is false.

The retransmission apparatus according to the first aspect may be embodied in an exemplary mode in which the TS packet determination unit is further configured to make a determination as to whether a number of received TS packets which include therein cyclic continuity counter values not consecutive to each other is equal to or larger than a second predetermined threshold value T, and is further configured to send an off-the-air signal to the plurality of receiving apparatuses, without retransmitting the received TS packets, when the determination is true.

The retransmission apparatus according to the first aspect may be embodied in an exemplary another mode in which the TS packet determination unit is further configured such that, when a current one and a previous one of the received TS packets are consecutive to each other in the cyclic continuity counter, the TS packet determination unit stores the current TS packet into a buffer, sets n: a number of successively received TS packets whose cyclic continuity counter values are consecutive to each other, to n+1, sets t: a number of successively received TS packets which are dropped, to t+1, and retransmits the TS packets stored in the buffer to the plurality of receiving apparatuses and sets t to "0," when the n is equal to or larger than the first predetermined value N.

The retransmission apparatus according to the first aspect may be embodied in exemplary still another mode in which the TS packet determination unit is further configured such that, when the current and previous TS packets are not consecutive to each other in the cyclic continuity counter, the TS packet determination unit, drops the TS packets stored in the buffer, sets the n to "0,"

sets the t to t+1, and sends an off-the-air signal to the plurality of receiving apparatuses, when the t is equal to a second predetermined value T.

The retransmission apparatus according to the first aspect may be embodied in exemplary yet still another mode in which the TS packets are based on a standard of Association of Radio Industries and Businesses (ARIB) STD-B31, and
the cyclic continuity counter is a Transport Stream Packet (TSP) counter according to the standard of ARIB STD-B31.

The retransmission apparatus according to the first aspect may be embodied in an exemplary alternative mode, further comprising:
a payload formation unit configured to form a payload using each TS packet outputted from the TS packet determination unit;
an RTP processing unit configured to generate a Real-time Transport Protocol (RTP) packet using the payload; and
an IP multicast sending unit configured to form the RTP packet into an Internet Protocol (IP) packet, and send the IP packet to the plurality of receiving apparatuses by multicast communication.

According to a second aspect of the present invention, there is provided a retransmission system comprising:
an antenna for receiving a digital broadcast wave from a broadcasting station;
a plurality of tuners connected to the antenna, each of which can be tuned to a frequency of a corresponding one of different channels; and
a plurality of retransmission apparatuses each of which is set forth in the first aspect, and which are connected to the tuners, respectively,
wherein the retransmission system is configured to send Internet Protocol (IP) packets including Transport Stream (TS) packets to a plurality of receiving apparatuses through an IP network.

According to a third aspect of the present invention, there is provided a retransmission method used for an apparatus that receives Transport Stream (TS) packets based on a broadcast wave, for retransmitting the TS packets to a plurality of receiving apparatuses through a network, the method comprising:
retrieving cyclic continuity counter values from the TS packets upon reception;
making a determination as to whether a number of ones of the received TS packets which include therein cyclic continuity counter values consecutive to each other is equal to or larger than a first predetermined threshold value N;
retransmitting the received TS packets to the plurality of receiving apparatuses when the determination is true; and
dropping the received TS packets when the determination is false.

DETAILED DESCRIPTION OF THE INVENTION

Several presently preferred embodiments of the invention will be described in more detail by reference to the drawings in which like numerals are used to indicate like elements throughout.

Figure 2:
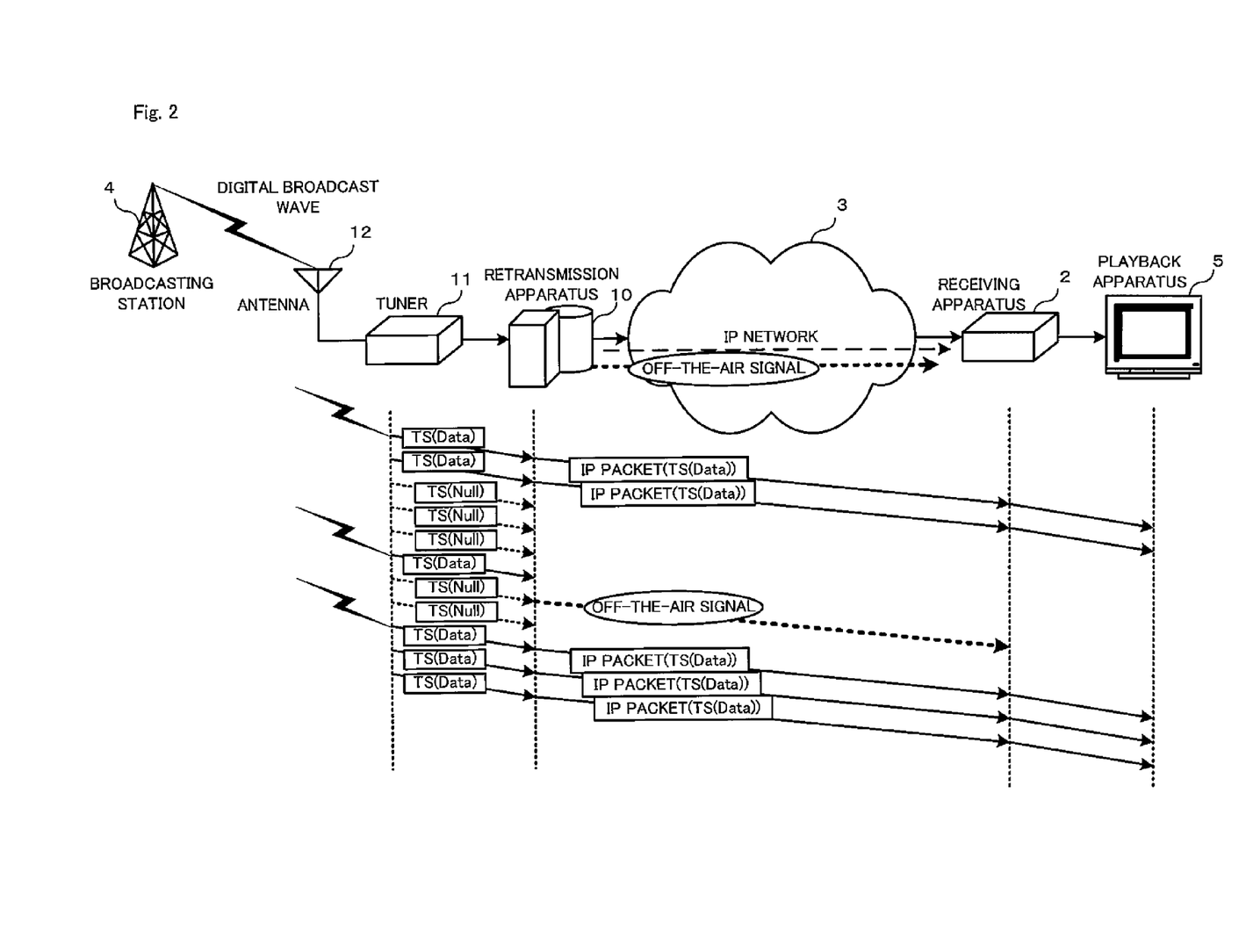
FIG. 2 is a system configuration diagram for an illustrative embodiment of the present invention.

FIG. 2 is a system configuration diagram for an illustrative embodiment of the present invention.

Figure 3:
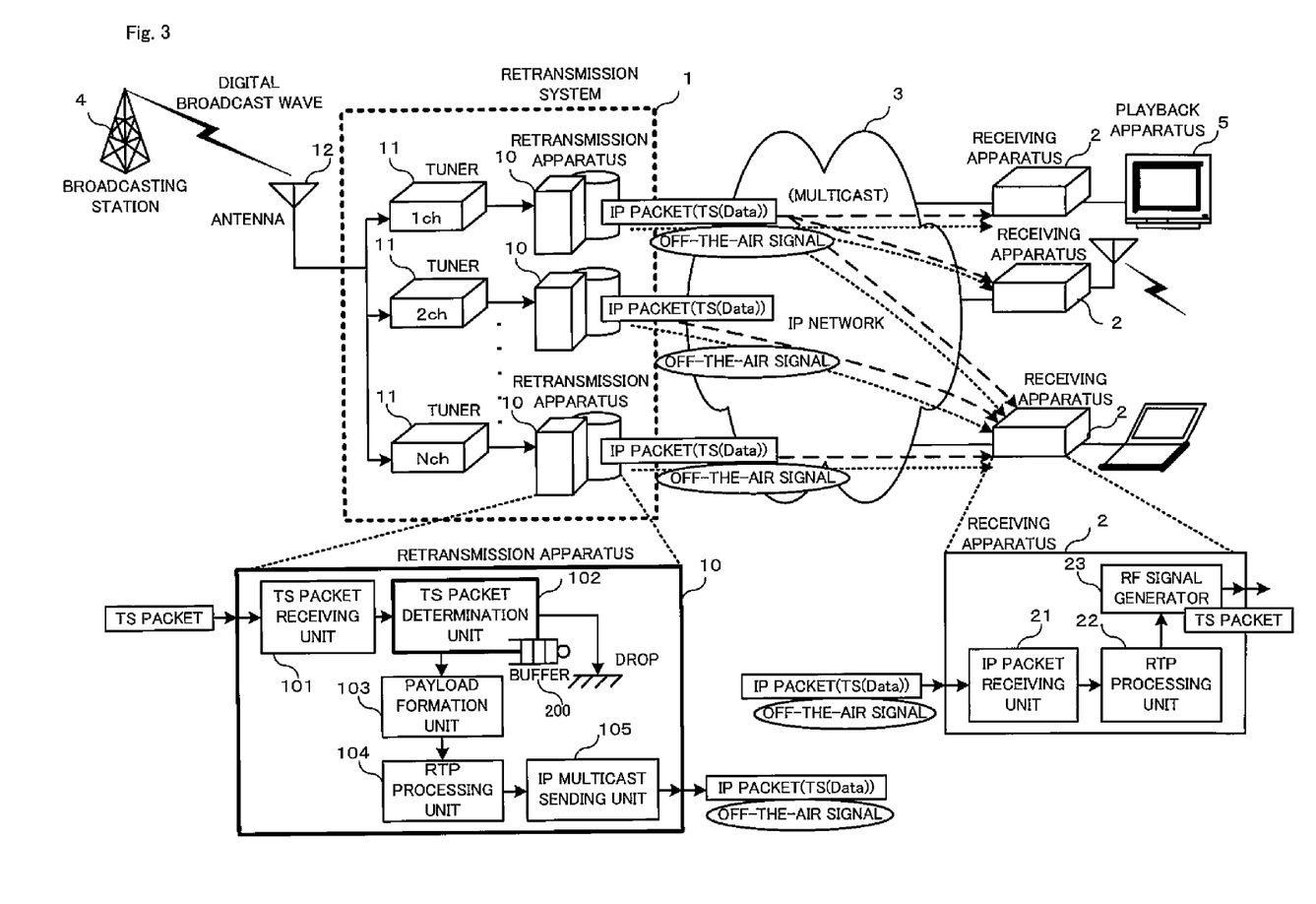
FIG. 3 is a functional configuration diagram of a retransmission apparatus according to the illustrative embodiment of the present invention.

As shown in FIGS. 2 and 3, compared with FIG. 1, each retransmission apparatus 10 generates IP packets based on only TS packets which include therein cyclic continuity counter values consecutive to each other, provided that the number of the consecutive TS packets is equal to or larger than a predetermined threshold value N. The cycle continuity counter values of TS packets are consecutive, if these TS packets have been received normally or successfully. The IP packet is sent to a plurality of receiving apparatuses 2. This makes it unnecessary to send null TS packets to an IP network 3.

In the case where each TS packet is based on the Association of Radio Industries and Businesses (ARIB) STD-B31 standard, the cyclic continuity counter value is called a Transport Stream Packet (TSP) counter (cyclic counter) value (i.e., TSP_counter). The retransmission apparatus 10 always confirms the continuity of the TSP counter values in a time series of TS packets received from the tuner 11. Thus, if the continuity is confirmed, then the consecutive TS packets are assumed to be valid, and these are formed into an IP packet. The IP packet is sent to the receiving apparatuses 2 through the IP network 3.

On the other hand, if the continuity is not confirmed, then the non-consecutive TS packets are dropped or discarded. In addition, if the number of non-consecutive TS packets, whose cyclic continuity counter values are not consecutive to each other, is equal to or larger than a second predetermined threshold value T, without retransmitting these TS packets, the retransmission apparatus 10 sends an "off-the-air" signal to the receiving apparatuses 2. This allows the receiving apparatuses 2 to recognize that the broadcasting of the broadcast wave is shut down or off the air, meaning that the retransmission apparatus 10 explicitly notifies the receiving apparatuses 2 that a reception failure is not due to the IP network 3.

FIG. 3 is a functional configuration diagram for a retransmission system 1 according to the present embodiment of the present invention.

As shown in FIG. 3, the retransmission system 1 retransmits a digital broadcast wave received from a broadcasting station 4, to a plurality of receiving apparatuses 2 connected to the IP network 3. This retransmission system 1 is provided by a telecommunication carrier or a broadcast enterprise. The retransmission system 1 has a combination of a plurality of retransmission apparatuses 10, and a plurality of tuners 11 disposed on a channel-by-channel basis. Also, each retransmission apparatus 10 transmits IP packets to the plurality of receiving apparatuses 2 by multicast communication through the IP network 3. A user of a playback apparatus 5 connected to a corresponding one of the plurality of receiving apparatuses 2, views and listens to a program broadcast on a channel which is selected by a corresponding one of the tuners 11 and which is retransmitted by the retransmission system 1.

As shown in FIG. 3, each retransmission apparatus 10 has a TS packet receiving unit 101, a TS packet determination unit 102, a payload formation unit 103, a Real-time Transport Protocol (RTP) processing unit 104 and an IP multicast sending unit 105. These functional units can be implemented by executing programs by a computer built in the retransmission apparatus 10.

The TS packet receiving unit 101 receives TS packets using a specific channel from the corresponding tuner 11. The received TS packets are outputted to the TS packet determination unit 102.

The TS packet determination unit 102 makes a determination as to whether the number of successively received TS packets whose cyclic continuity counter values are consecutive to each other, is equal to or larger than the first predetermined threshold value N. These TS packets are retransmitted when the determination is true, or are dropped when the determination is false. Also, the TS packet determination unit 102 further makes a determination as to whether the number of successively received TS packets whose cyclic continuity counter values are not consecutive to each other, is equal to or larger than a second predetermined threshold value T, without retransmitting these TS packets. When the determination is true, an "off-the-air" signal is sent to the receiving apparatuses 2. The TS packet determination unit 102 is a special feature part to the present embodiment of the present invention.

The payload formation unit 103 forms a payload out of TS packets which are received from the TS packet determination unit 102. The formed payload is outputted to the RTP processing unit 104.

The RTP processing unit 104 generates an RTP packet from the payload. The generated RTP packet is outputted to the IP multicast sending unit 105.

The IP multicast sending unit 105 forms the RTP packet into an IP packet. The IP packet is sent to the plurality of receiving apparatuses 2 by multicast communication.

On the other hand, each receiving apparatus 2 has an IP packet receiving unit 21, an RTP processing unit 22 and an RF signal generator 23. The IP packet receiving unit 21 receives IP packets from the retransmission apparatuses 10 through the IP network 3, and removes an IP header from the IP packet to form an RTP packet. The RTP packet is outputted to the RTP processing unit 22. The RTP processing unit 22 removes an RTP header from the RTP packet to form a TS packet. The TS packet is outputted to the RF signal generator 23. The RF signal generator 23 generates an RF signal from the TS packet. The RF signal is outputted to a corresponding one of playback apparatuses 5.

Figure 4:
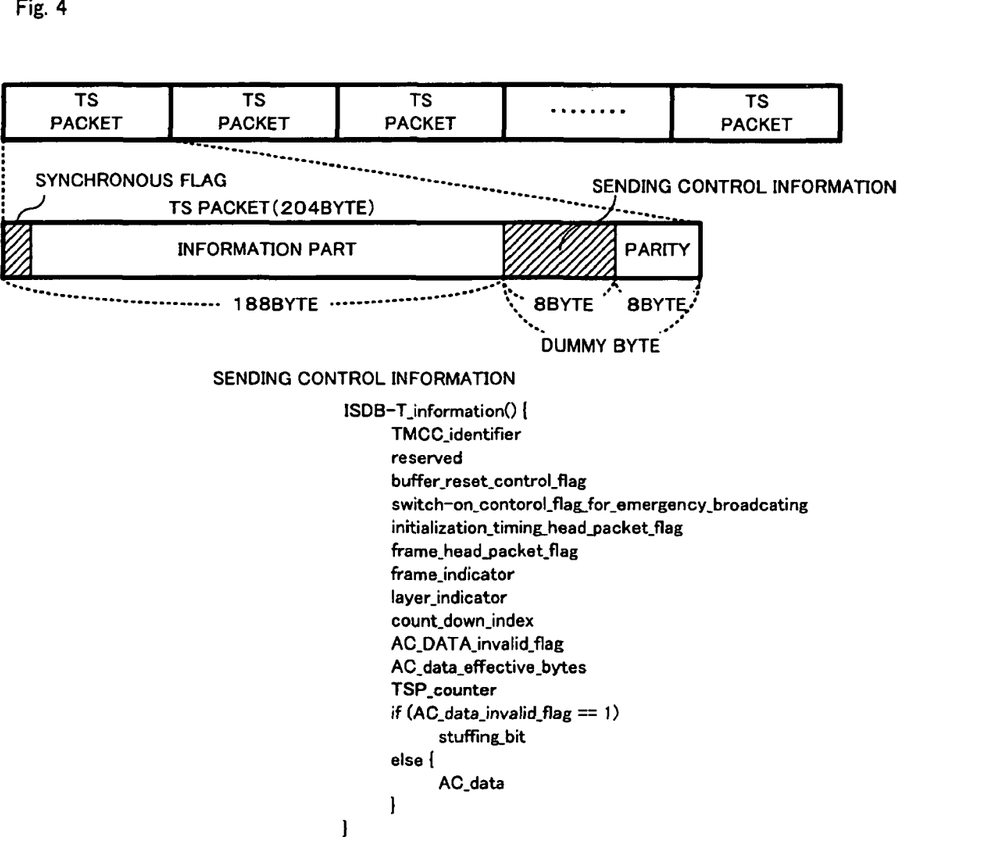
FIG. 4 is a frame configuration diagram of a time series of TS packets.

FIG. 4 is a frame configuration diagram of the TS packets.

As shown in FIG. 4, a plurality of TS packets are transmitted in succession, each of which is based on the ARIB STD-B31 standard. Each TS packet has a synchronizing flag, an information part and a dummy bytes part. The dummy bytes part has transmission control information and optional parity bytes. The cyclic continuity counter value is a value of a "Transport Stream Packet (TSP) counter" in "Integrated Service Digital Broadcasting for Terrestrial Television Broadcasting Information (ISDB-T)". The maximum value of the TSP_counter varies depending on a modulation mode of the digital broadcasting. Therefore, the retransmission apparatus 10 gets a modulation parameter from a TS packet in advance to recognize the appropriate maximum value.

Figure 5:
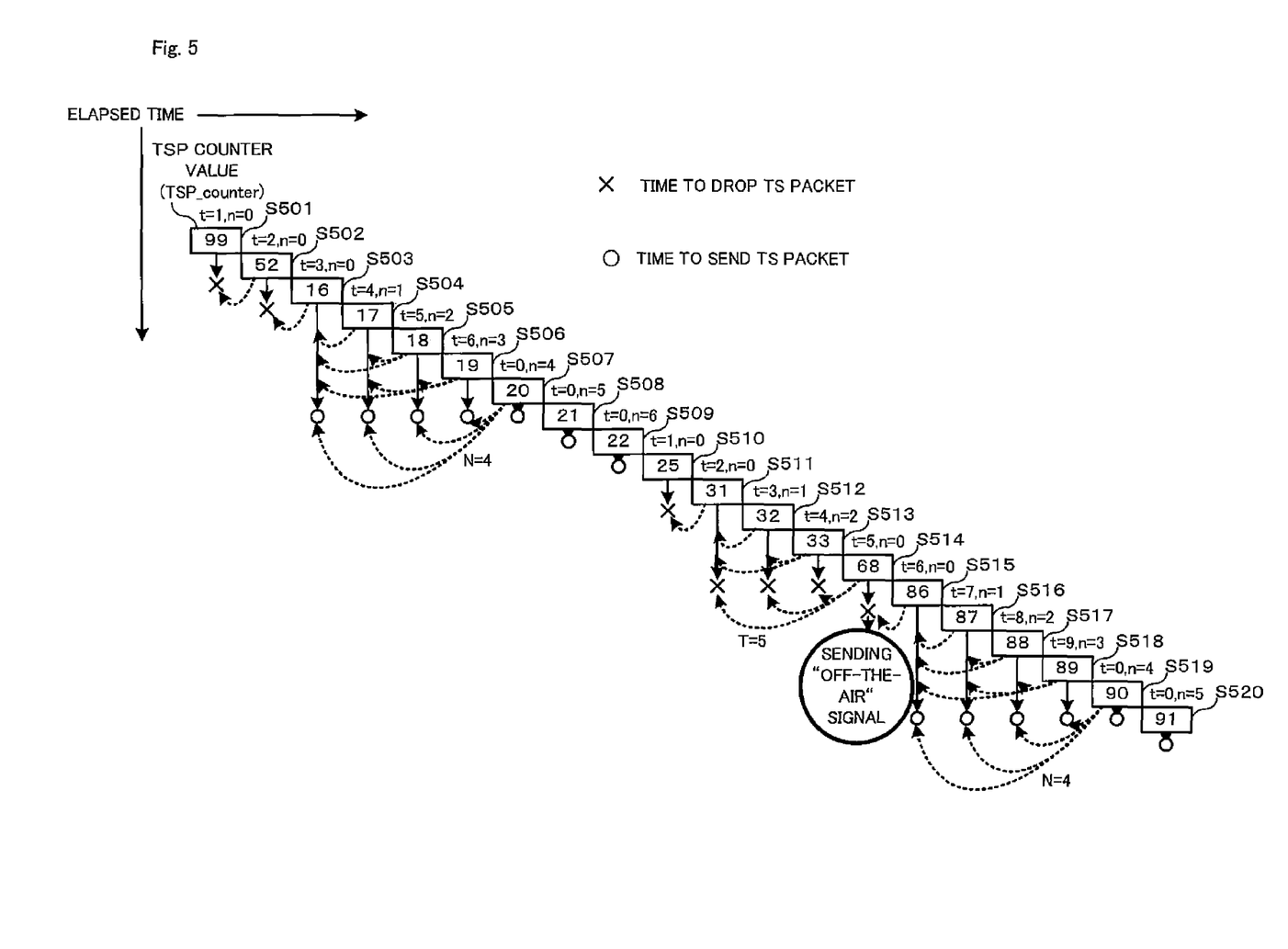
FIG. 5 is an illustration of how TS packets are retransmitted by the retransmission apparatus according to the illustrative embodiment of the present invention.

FIG. 5 is an illustration of how the TS packets are retransmitted by the retransmission apparatus 10 according to the illustrative embodiment of the present invention.

As shown in FIG. 5, both a vertical axis and a horizontal axis show an elapse of time. Along the horizontal axis, TS packets and TSP counter values are shown in the order that the TS packets are received. Along the vertical axis, points of time are shown at each of which the TS packets are determined to be valid (shown with "o"), or invalid (shown with "x").

The following variables are also used:
n: the number of successively and successfully received TS packets whose TSP counter values are consecutive to each other, that is, a consecutive-packet count,
N: a threshold value which is compared with the consecutive-packet count n for determining whether received TS packets are "valid" (for example, N=4,
t: the number of successively received TS packets which are dropped, that is, a dropped-packet count,
T: a threshold value of the dropped-packet count t for determining whether received TS packets are "invalid," and whether it is necessary to send an off-the-air signal (for example, T=5),
NS: the TSP counter value of a current or newest one of the received TS packets, and
BS: the TSP counter value of a previous TS packet to the current TS packet, which is adjacent to the current TS packet.

The dropped-packet count t is more specifically shown as follows:

The dropped-packet count $t$=(the number of ones of the received TS packets which were dropped at the previous time)+(the number of ones of the received packets which will be possibly dropped at the next time).

The "number of ones of the received packets which will be possibly dropped at the next time" does not depend on whether the TSP counter values are consecutive. That is to say, even if the TSP counter values are consecutive, the dropped-packet count t is set to t+1 (t=t+1). This means that, even if the TSP counter values are consecutive, these TS packets are possibly dropped, unless the consecutive-packet count n is equal to or larger than the threshold value N.

First, it is assumed that the TSP counter value BS of the previous TS packet (hereinafter, "previous TSP counter value BS") is "−1" (BS=−1).

(S501) When a current TS packet with the current TSP counter value NS [99] is received, the NS [99] is not consecutive to the BS [−1]. Therefore, the current TS packet [99] is reserved or stored, and the dropped-packet count t is set to "1" (t=1) (the consecutive-packet count n=0).

(S502) When a current TS packet with the current TSP counter value NS [52] is received, the NS [52] is not consecutive to the updated BS [99]. Therefore, the previous TS packet [99] is dropped, and the current TS packet [52] is reserved. Further, the dropped-packet count t is set to "2" (t=2) (the consecutive-packet count n=0).

(S503) When a current TS packet is received with the current TSP counter value NS [16], the NS [16] is not consecutive to the updated previous TSP counter value [52]. Therefore, the previous TS packet [52] is dropped, and the current TS packet [16] is reserved. Further, the dropped-packet count t is set to "3" (t=3) (the consecutive-packet count n=0).

(S504) When a current TS packet with the current TSP counter value NS [17] is received, the NS [17] is consecutive to the updated previous TSP counter value BS [16]. Therefore, the current TS packet [17] is reserved, and the consecutive-packet count n is set to "1" (n=1) (the dropped-packet count t=4).

(S505) When a current TS packet with the current TSP counter value NS [18] is received, the NS [18] is consecutive to the updated previous TSP counter value BS [17]. Therefore, the current TS packet [18] is reserved, and the consecutive-packet count n is set to "2" (n=2) (the dropped-packet count t=5).

(S506) When a current TS packet with the current TSP counter value NS [19] is received, the NS [19] is consecutive to the updated previous TSP counter value BS [18]. Therefore, the current TS packet [19] is reserved, and the consecutive-packet count n is set to "3" (n=3) (the dropped-packet count t=6).

(S507) When a current TS packet with the current TSP counter value NS [20] is received, the NS [20] is consecutive to the updated previous TSP counter value BS [19]. Therefore, the current TS packet [20] is reserved, and the consecutive-packet count n is set to "4" (n=4). Then, because of n=N=4, all the reserved TS packets [16], [17], [18], [19] and [20] are determined to be valid, and are transmitted to the receiving apparatuses 2. And, the dropped-packet count t is reset to zero (t=0).

(S508) When a current TS packet with the current TSP counter value NS [21] is received, the NS [21] is consecutive to the updated previous TSP counter value BS [20]. Therefore, the current TS packet [21] is determined to be valid, and is transmitted to the receiving apparatuses 2. And the consecutive-packet count is set to "5" (n=5) (the dropped-packet count t=0).

(S509) When a current TS packet with the current TSP counter value NS [22] is received, the NS [22] is consecutive to the updated previous TSP counter value BS [21]. Therefore, the current TS packet [22] is determined to be valid, and is transmitted to the receiving apparatuses 2. And the consecutive-packet count is set to "6" (n=6) (the dropped-packet count t=0).

(S510) When a current TS packet with the current TSP counter value NS [25] is received, the NS [25] is not consecutive to the updated previous TSP counter value BS [22]. Therefore, the current TS packet [25] is reserved, the dropped-packet count t is set to "1" (t=1), and the consecutive-packet count n is set to zero (n=0).

(S511) When a current TS packet with the current TSP counter value NS [31] is received, the NS [31] is not consecutive to the updated previous TSP counter value BS [25]. Therefore, the previous TS packet [25] is dropped, and the current TS packet [31] is reserved. Further, the dropped-packet count t is set to "2" (t=2) (the consecutive-packet count n=0).

(S512) When a current TS packet with the current TSP counter value NS [32] is received, the NS [32] is consecutive to the updated previous TSP counter value BS [31]. Therefore, the current TS packet [32] is reserved consecutive-packet count n is set to "1" (n=1) (the dropped-packet count t=3).

(S513) When a current TS packet with the current TSP counter value NS [33] is received, the NS [33] is consecutive to the updated previous TSP counter value BS [32]. Therefore, the current TS packet [33] is reserved, and the consecutive-packet count n is set to "2" (n=2) (the dropped-packet count t=4).

(S514) When a current TS packet with the current TSP counter value NS [68] is received, the NS [68] is not consecutive to the updated previous TSP counter value BS [33]. Therefore, the stored TS packets [31], [32] and [33] are dropped, and the current TS packet [68] is reserved. Further, the dropped-packet count t is set to "5" (t=5), and the consecutive-packet count is reset to zero (n=0). Then, because of t=T=5, an "off-the-air" signal is sent to the receiving apparatuses 2.

(S515) When a current TS packet with the current TSP counter value NS [86] is received, the NS [86] is not consecutive to the updated previous TSP counter value BS [68]. Therefore, the previous TS packet [68] is dropped, and the current TS packet [86] is reserved. Further, the dropped-packet count t is set to "6" (t=6) (the consecutive-packet count n=0).

(S516) When a current TS packet with the current TSP counter value NS [87] is received, the NS [87] is consecutive to the updated previous TSP counter value BS [86]. Therefore, the current TS packet [87] is reserved, and the consecutive-packet count n is set to "1" (n=1) (the dropped-packet count t=7).

(S517) When a current TS packet with the current TSP counter value NS [88] is received, the NS [88] is consecutive to the updated previous TSP counter value BS [87]. Therefore, the current TS packet [88] is reserved, and the consecutive-packet count n is set to "2" (n=2) (the dropped-packet count t=8).

(S518) When a current TS packet with the current TSP counter value NS [89] is received, the NS [89] is consecutive to the updated previous TSP counter value BS [88]. Therefore, the current TS packet [89] is reserved, and the consecutive-packet count n is set to "3" (n=3) (the dropped-packet count t=9).

(S519) When a current TS packet with the current TSP counter value NS [90] is received, the NS [90] is consecutive to the updated previous TSP counter value BS [89]. Therefore, the current TS packet [90] is reserved, and the consecutive-packet count n is set to "4" (n=4). Then, because of n=N=4, all the reserved TS packets [86], [87], [88], [89] and [90] are determined to be valid, and are transmitted to the receiving apparatuses 2. And, the dropped-packet count t is reset to zero (t=0).

(S520) When a current TS packet with the current TSP counter value NS [91] is received, the NS [91] is consecutive to the updated previous TSP counter value BS [90]. Then, the current TS packet [91] is determined to be valid, and is transmitted to the receiving apparatuses 2. Further, the consecutive-packet count n is set to (n=5) (the dropped-packet count t=0).

Figure 6:
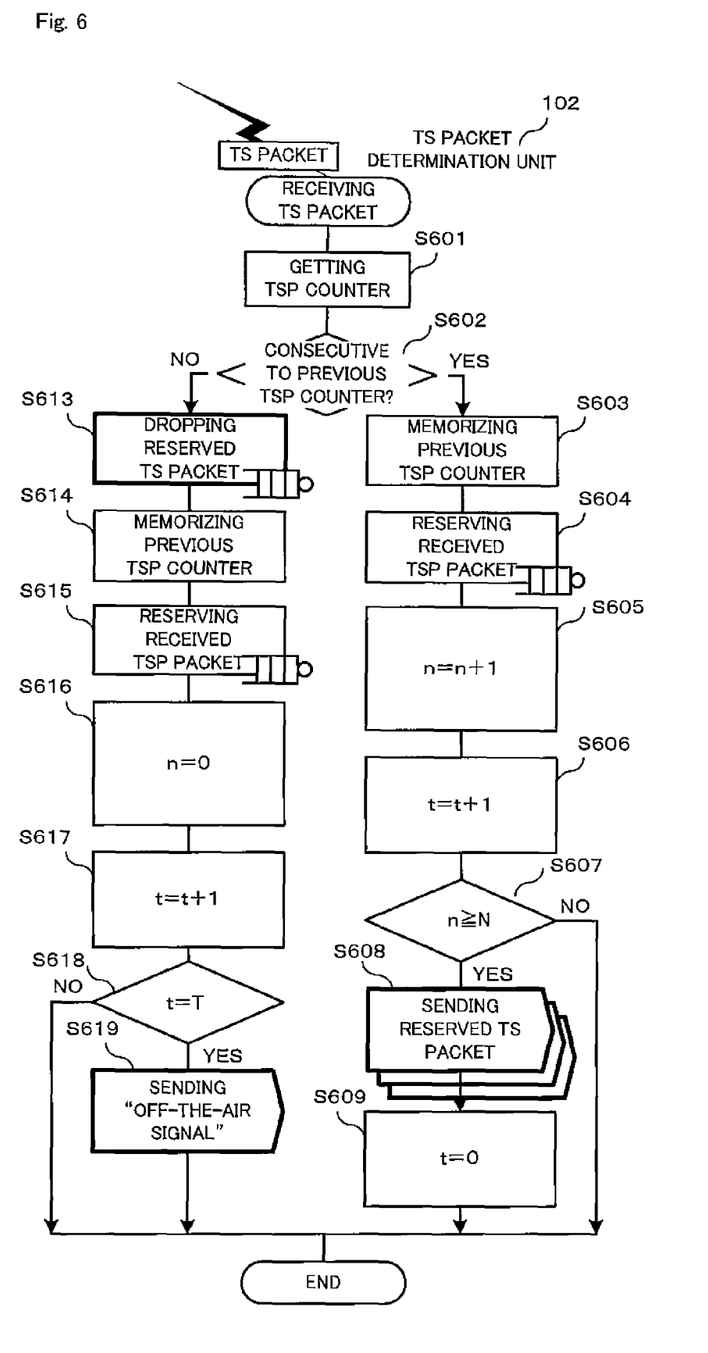
FIG. 6 is a flow chart of how the TS packet determination unit operates in the retransmission apparatus according to the illustrative embodiment of the present invention.

FIG. 6 is a flow chart of how the TS packet determination unit 102 operates in the retransmission apparatus 10 according to the illustrative embodiment of the present invention.

The flow of FIG. 6 is executed by the TS packet determination unit 102 after receiving a TS packet from the TS packet receiving unit 101.

(S601) First of all, a current TSP counter value NS (TSP_counter) is retrieved from a current TS packet.

(S602) It is determined whether the current TSP counter value NS is consecutive to the already-stored previous TSP counter value BS.

(S603) When the current TSP counter value NS is consecutive to the previous TSP counter value BS, the current TSP counter value NS is updated to be equal to the previous TSP counter value BS.

(S604) The currently-received TS packet is reserved in a buffer 200. While the consecutive-packet count n is smaller than the threshold value N (n<N), a plurality of TS packets are reserved in the buffer 200.

(S605) The consecutive-packet count n is set to n+1 (n=n+1).

(S606) The dropped-packet count t is set to t+1 (t=t+1). Even if the TSP counter values BS and NS are consecutive, if the consecutive-packet count n remains smaller than the threshold value N, then the TS packets will be possibly dropped.

(S607) It is determined whether the consecutive-packet count n is equal to or larger than the threshold value N. If the consecutive-packet count n is smaller than the threshold value N (n<N), then the reserved TS packets cannot be determined to be valid. Thus, the process is finished.

(S608) If the consecutive-packet count n is equal to or larger than the threshold value N (n≧N), then all the reserved TS packets are determined to be consecutive in TSP counter and valid. And, all the reserved TS packets are outputted to the payload formation unit 103, and eventually are transmitted to receiving apparatuses 2.

(S609) The dropped-packet count t is reset to zero (t=0).

(S613) If the current TSP counter value NS is not consecutive to the previous TSP counter value BS, then all the reserved TS packets are dropped.

(S614) Then, the current TSP counter value NS is updated to be equal to the previous TSP counter value BS.

(S615) The currently-received TS packet is reserved in the buffer 200. The reason is that, following this TS packet, a newly-received TS packet can be consecutive in TSP counter.

(S616) The consecutive-packet count n is reset to zero (n=0).

(S617) The dropped-packet count t is set to t+1 (t=t+1).

(S618) It is determined whether the dropped-packet count t is equal to the threshold value T. If the dropped-packet count t is not equal to the threshold value T, then the process is finished.

(S619) If the dropped-packet count t is equal to the threshold value T, then it is determined that the broadcast wave is not received successfully. Then, an "off-the-air" signal is outputted to the payload formation unit 103, and eventually is transmitted to the receiving apparatuses 2.

Accordingly, the retransmission apparatus 10, when retransmitting the broadcast packets, can inform the plurality of receiving apparatuses that the broadcast wave itself cannot be received, without wasting communication resources in an IP network 3.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A retransmission apparatus for retransmitting Transport Stream (TS) packets based on a received broadcast wave to a plurality of receiving apparatuses through a network, the retransmitting apparatus comprising:
a TS packet determination unit configured to make a determination as to whether a number of received TS packets which include therein cyclic continuity counter values consecutive to each other is equal to or larger than a first predetermined threshold value N, and further configured to retransmit the received TS packets to the plurality of receiving apparatuses when the determination is true, and to drop the received TS packets when the determination is false.

2. The retransmission apparatus as claimed in claim 1, wherein, the TS packet determination unit is further configured to make a determination as to whether a number of received TS packets which include therein cyclic continuity counter values not consecutive to each other is equal to or larger than a second predetermined threshold value T, and is further configured to send an off-the-air signal to the plurality of receiving apparatuses, when the determination is true.

3. The retransmission apparatus as claimed in claim 1, wherein the TS packet determination unit is further configured such that, when a current one and a previous one of the received TS packets are consecutive to each other in the cyclic continuity counter, the TS packet determination unit stores the current TS packet into a buffer,
sets n: a number of successively received TS packets whose cyclic continuity counter values are consecutive to each other, to n+1,
sets t: a number of successively received TS packets which are dropped, to t+1, and sretransmits the TS packets stored in the buffer to the plurality of receiving apparatuses and sets the t to "0" when the n is equal to or larger than the first predetermined value N.

4. The retransmission apparatus as claimed in claim 3, wherein the TS packet determination unit is further configured such that, when the current and previous TS packets are not consecutive to each other in the cyclic continuity counter, the TS packet determination unit,
drops the TS packets stored in the buffer,
sets the n to "0",
sets the t to t+1, and
sends an off-the-air signal to the plurality of receiving apparatuses, when t is equal to a second predetermined value T.

5. The retransmission apparatus as claimed in claim 1, wherein the TS packets are based on a standard of Association of Radio Industries and Businesses (ARIB) STD-B31, and
the cyclic continuity counter is a Transport Stream Packet (TSP) counter according to the standard of ARIB STD-B31.

6. The retransmission apparatus as claimed in claim 1, further comprising:
a payload formation unit configured to form a payload using each TS packet outputted from the TS packet determination unit;
a RTP processing unit configured to generate a Real-time Transport Protocol (RTP) packet using the payload; and
an IP multicast sending unit configured to form the RTP packet into an Internet protocol (IP) packet, and send the IP packet to the plurality of receiving apparatuses by multicast communication.

7. A retransmission system comprising:
an antenna for receiving a digital broadcast wave from a broadcasting station;
a plurality of tuners connected to the antenna, each of which can be tuned to a frequency of a corresponding one of different channels; and
a plurality of retransmission apparatuses each of which is set forth in claim 1, and which are connected to the tuners, respectively,
wherein the retransmission system is configured to send Internet Protocol (IP) packets including Transport Stream (TS) packets to a plurality of receiving apparatus apparatuses through an IP network.

8. A retransmission method used for an apparatus that receives Transport Stream (TS) packets based on a broadcast wave, for retransmitting the TS packets to a plurality of receiving apparatuses through a network, the method comprising:
retrieving a cyclic continuity counter values from the TS packets upon reception;
making a determination as to whether a number of ones of the received TS packets which include therein cyclic continuity counter values consecutive to each other is equal to or larger than a first predetermined threshold value N;

retransmitting the received TS packets to the plurality of receiving apparatuses when the determination is true; and dropping the received TS packets when the determination is false.

9. A method of retransmitting Transport Stream (TS) packets based on a received broadcast wave to a receiver through a network, the method comprising:

making a determination as to whether a number of received TS packets which include therein cyclic continuity counter values not consecutive to each other is equal to or larger than a threshold value; and sending an off-the-air signal to the receiver, when the determination is true.

* * * * *